United States Patent [19]

Beulke

[11] Patent Number: 5,343,762
[45] Date of Patent: Sep. 6, 1994

[54] VORTEX FLOWMETER

[75] Inventor: Melvin R. Beulke, Hopkins, Minn.
[73] Assignee: Rosemount Inc., Eden Prairie, Minn.
[21] Appl. No.: 956,398
[22] Filed: Oct. 5, 1992
[51] Int. Cl.$^5$ .................................................. G01F 1/32
[52] U.S. Cl. ................................................. 73/861.24
[58] Field of Search ..................................... 73/861.24

[56] References Cited

U.S. PATENT DOCUMENTS

| | | | |
|---|---|---|---|
| 1,935,445 | 11/1933 | Heinz | 73/861.24 |
| 3,946,608 | 3/1976 | Herzl | 73/194 VS |
| 4,033,189 | 7/1977 | Herzl et al. | 73/194 VS |
| 4,169,376 | 10/1979 | Herzl | 73/194 VS |
| 4,201,084 | 5/1980 | Ito et al. | 73/194 VS |
| 4,248,098 | 2/1981 | Sawayama et al. | 73/861.24 |
| 4,339,957 | 7/1982 | Herzl | 73/861.24 |
| 4,464,939 | 8/1984 | Corpron | 73/861.24 |
| 4,475,405 | 10/1984 | Corpron et al. | 73/861.24 |
| 4,520,678 | 6/1985 | Koziol et al. | 73/861.24 |
| 4,625,564 | 12/1986 | Murakami et al. | 73/861.24 |
| 4,699,012 | 10/1987 | Lew et al. | 73/861.24 |
| 4,703,659 | 11/1987 | Lew et al. | 73/861.24 |
| 4,718,283 | 1/1988 | Kamentser | 73/861.22 |
| 4,791,818 | 12/1988 | Wilde | 73/861.24 |
| 4,884,441 | 12/1989 | Lew | 73/195 |
| 4,884,458 | 12/1989 | Lew | 73/861.24 |
| 4,891,990 | 1/1990 | Khalifa et al. | 73/861.24 |
| 4,911,019 | 3/1990 | Lew | 73/861.24 |
| 4,926,532 | 5/1990 | Phipps | 73/861.24 |
| 4,926,695 | 5/1990 | Kleven et al. | 73/861.24 |
| 4,972,723 | 11/1990 | Lew | 73/861.24 |
| 4,973,062 | 11/1990 | Lew | 73/861.24 |
| 4,984,471 | 1/1991 | Storer | 73/861.24 |
| 5,036,240 | 7/1991 | Lew | 310/338 |
| 5,076,105 | 12/1991 | Lew | 73/861.24 |
| 5,095,760 | 3/1992 | Lew | 73/861.24 |
| 5,109,704 | 5/1992 | Lew | 73/861.24 |
| 5,197,336 | 3/1993 | Tsuruoka et al. | 73/861.24 |

FOREIGN PATENT DOCUMENTS

| | | | |
|---|---|---|---|
| 0161967 | 12/1979 | Japan | 73/861.24 |
| 58-160813 | 9/1983 | Japan | |
| 823684 | 11/1959 | United Kingdom | 73/861.24 |

OTHER PUBLICATIONS

Mario Di Giovanni, *Flat and Corrugated Diaphragm Design Handbook*, 1982, pp. 157–163 of Chapter 13, and pp. 188–192 of Chapter 16.

Primary Examiner—Herbert Goldstein
Attorney, Agent, or Firm—Westman, Champlin & Kelly

[57] ABSTRACT

A vortex flowmeter for measuring fluid flow includes a conduit having a wall surrounding a bore for carrying the fluid along a bore axis. A pivoting member moves in response to vortices in the fluid and extends from a hole in the wall into the bore, and sensing means is provided for sensing the motion of the pivoting member to provide a flow indicative output. In one embodiment, a torsional pin is disposed in the hole and couples to the pivoting member, and further has a first pin end attached to the wall. In another embodiment a diaphragm extending across the hole, together with the conduit wall and the pivoting member, are integrally formed from a material so as to present an unbroken overall surface to the fluid and to reduce crevices or gaps in which portions of the fluid can lodge. In another embodiment the pivoting member is at least a portion of a downstream extremity of a body disposed in the bore. The body includes, in addition to the downstream extremity, an upstream extremity and a thinned area which flexes to permit motion of the pivoting member. In still other embodiments, the conduit is eliminated and replaced by a seating ring adapted to mate with a port of a conduit.

27 Claims, 13 Drawing Sheets

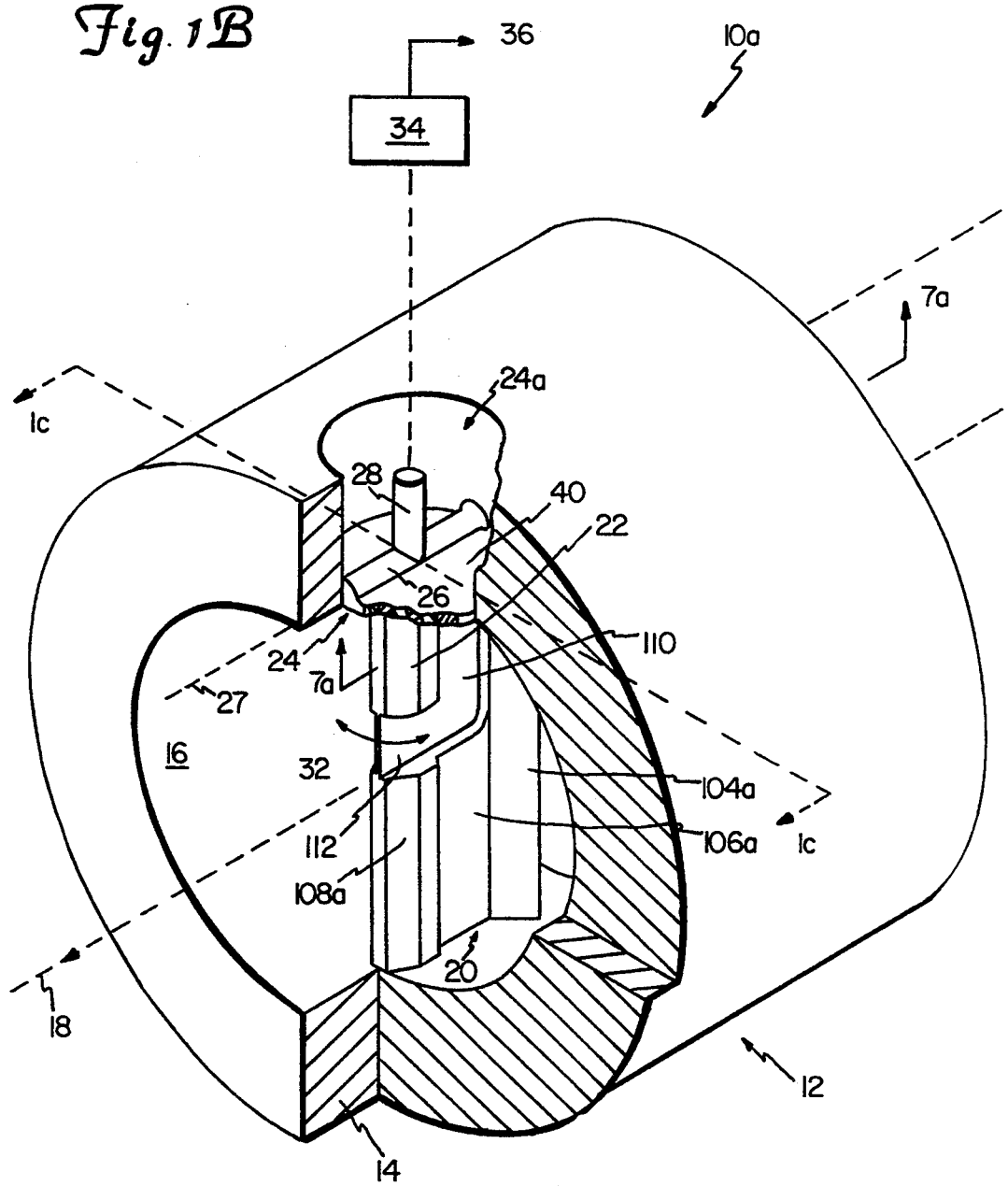

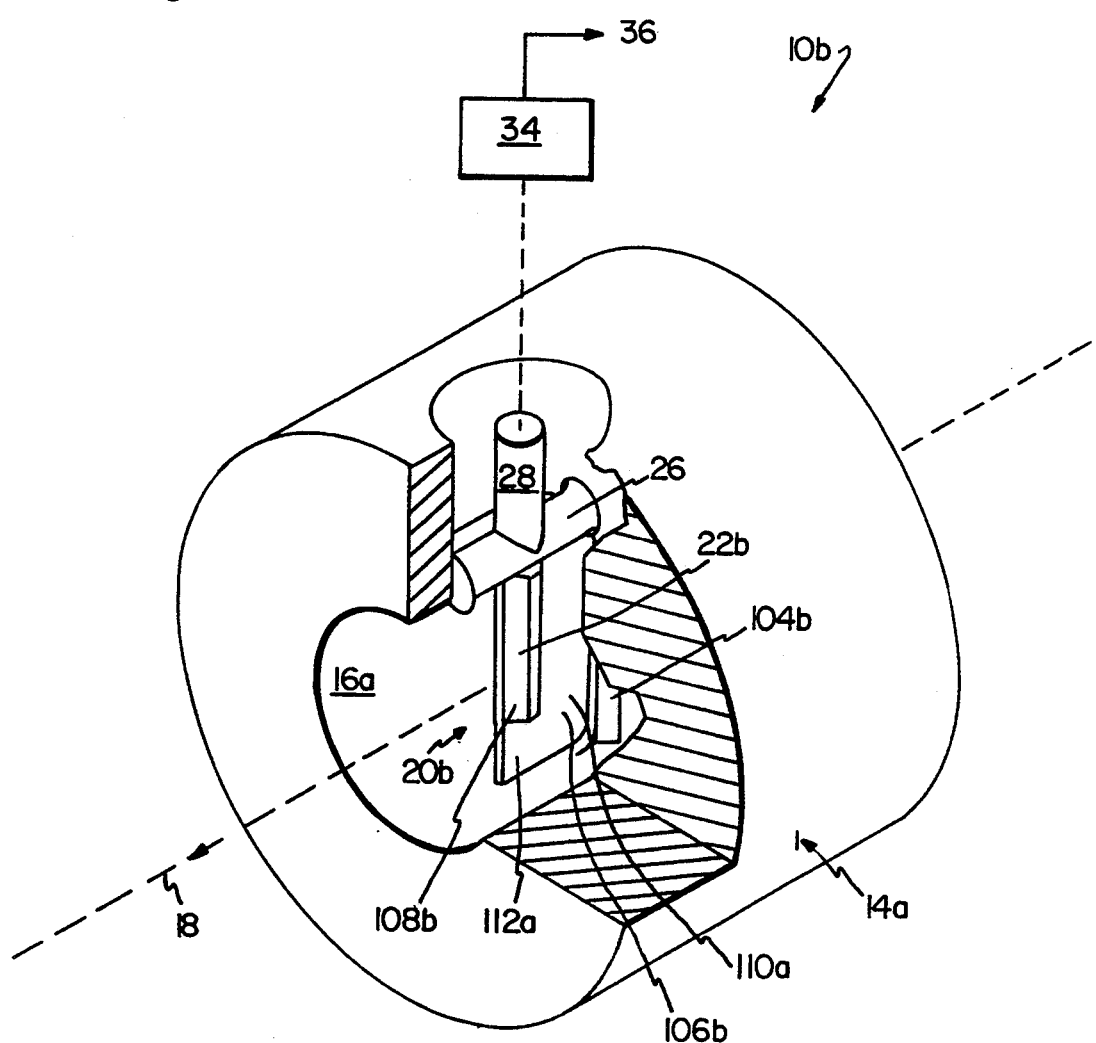

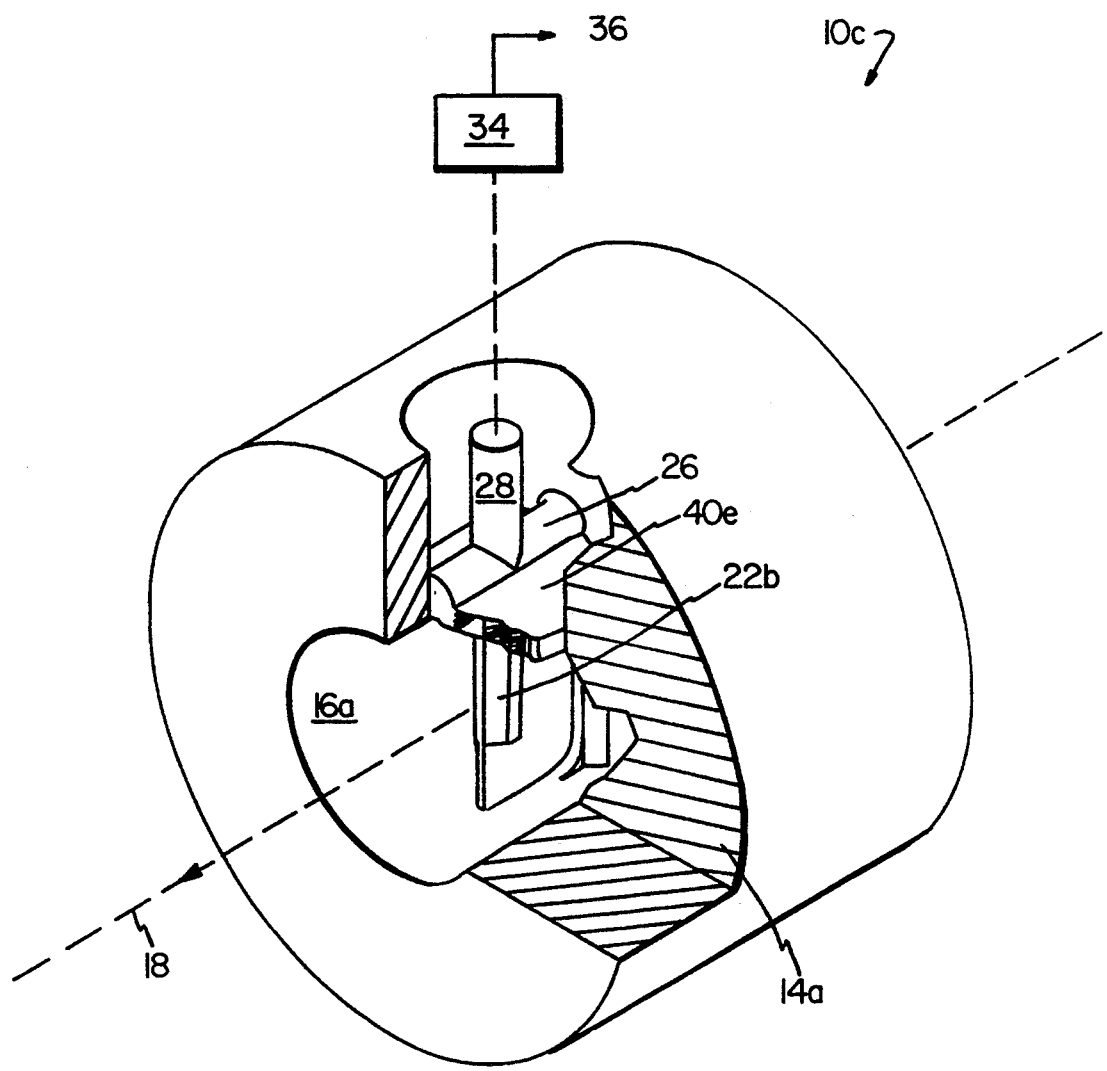

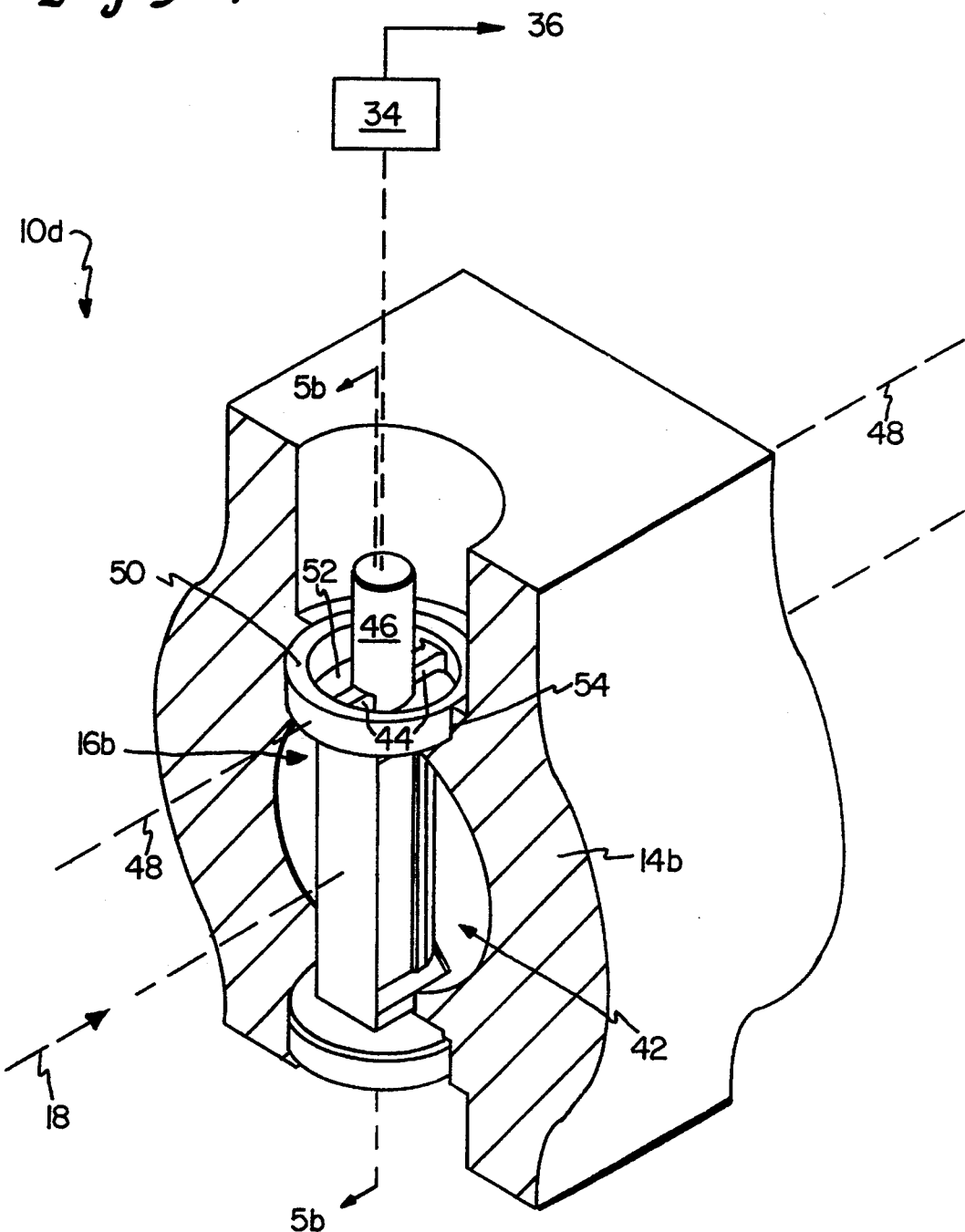

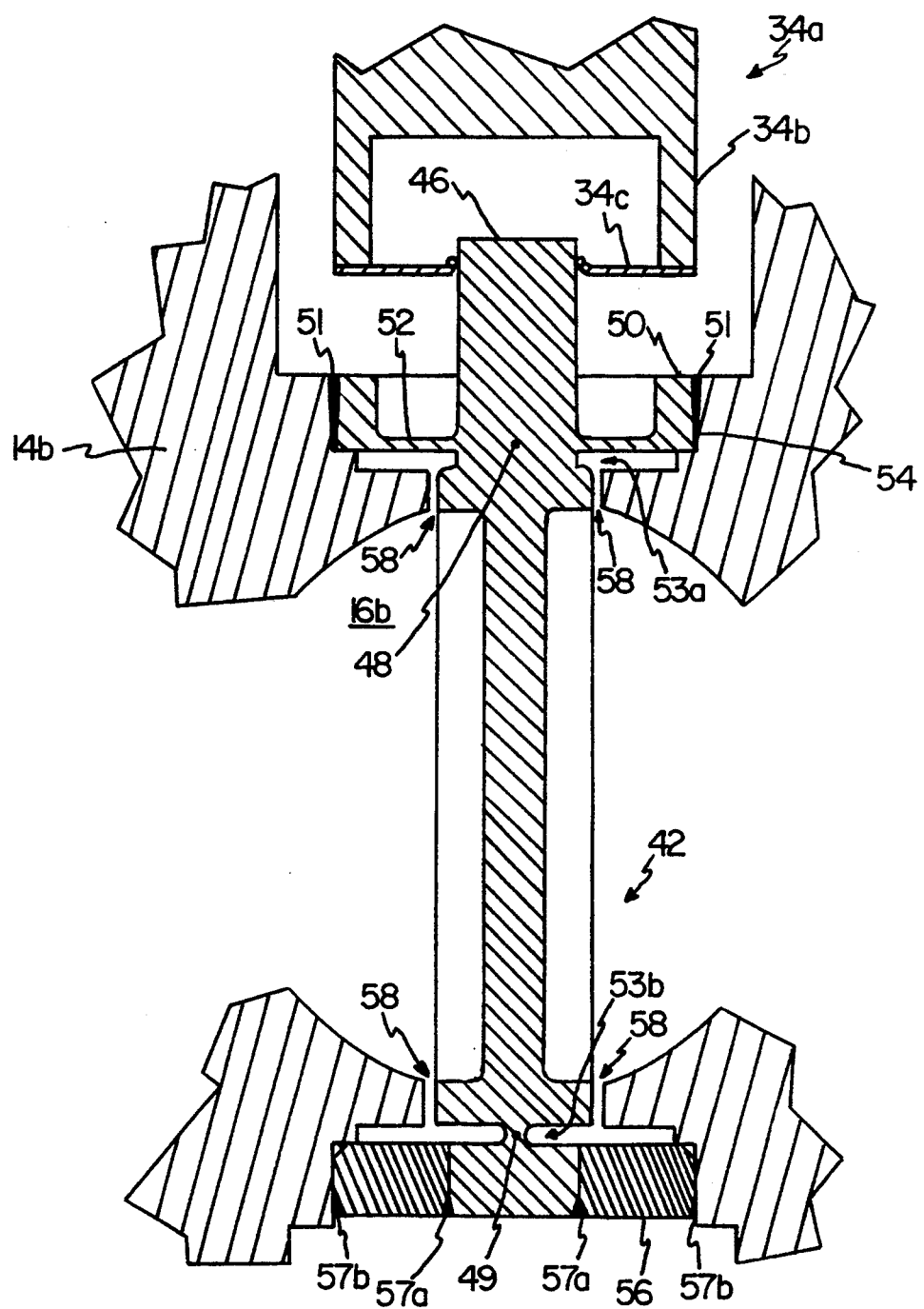

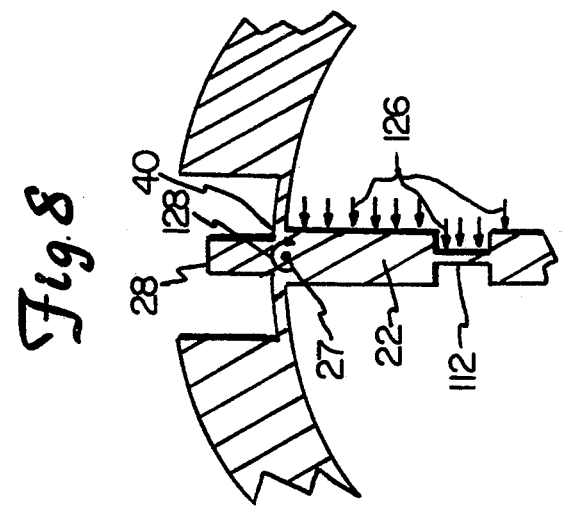
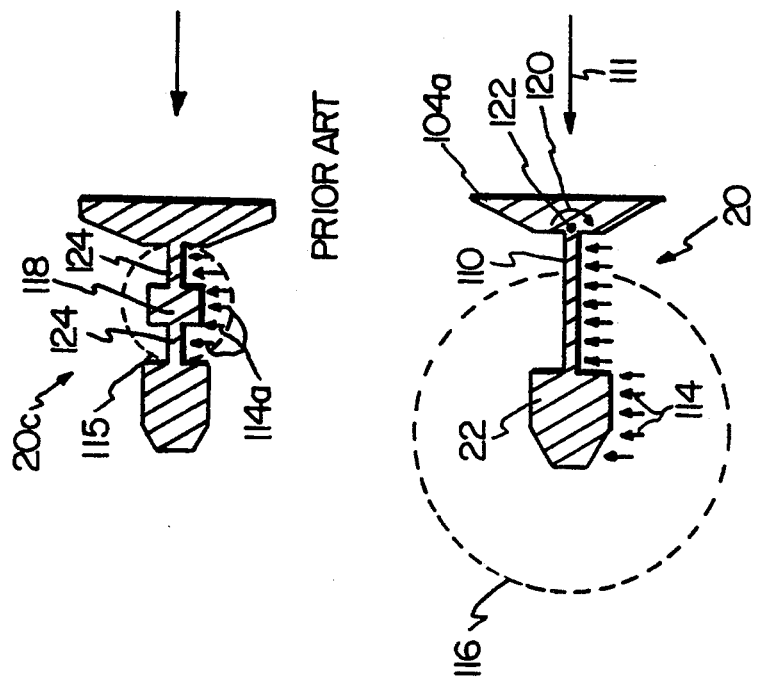

5,343,762

VORTEX FLOWMETER

BACKGROUND OF THE INVENTION

This invention relates to flowmeters, and in particular to flowmeters which operate on the principle of measuring the frequency or period of vortices in a Karman vortex street set up in a moving fluid.

BRIEF SUMMARY OF THE INVENTION

A first aspect of the present invention relates to a vortex flowmeter for measuring fluid flow, which flowmeter includes a conduit having a wall surrounding a bore which carries the fluid along a bore axis. A pivoting member extends from a hole in the wall into the bore, and a torsional pin having at least one pin end attached to the wall couples to the pivoting member. The torsional pin has a pin axis substantially parallel to the bore axis to permit pivotal motion of the pivoting member about the pin axis. The flowmeter includes sensing means coupled to the pivoting member for sensing its motion, in order to provide an output indicative of the flow. The torsional pin provides a restoring force tending to force the pivoting member back to its equilibrium position. Also, the pin reduces undesired motion of the pivoting member about axes perpendicular to the pin axis, while permitting motion about the pin axis.

In a preferred embodiment, the flowmeter also includes a diaphragm or other region of reduced stiffness which covers or seals the wall hole. By arranging the torsional pin to reinforce the diaphragm, the pin enhances the measurement capability of the flowmeter by reducing effects of fluctuating and static line pressure on the diaphragm.

In another preferred embodiment, the conduit is eliminated and replaced by a member, such as a seating ring, adapted to mate with a port in a conduit. The resulting flow device inserts into a conduit port in either a removable or permanent fashion.

Another aspect of the invention relates to a vortex flowmeter for measuring fluid flow, in which a conduit has a wall surrounding a bore for carrying the fluid, the wall having a region of reduced stiffness, preferably a diaphragm, formed therein. A pivoting member disposed in the bore connects to the diaphragm, and sensing means couples to the pivoting member to sense pivotal motion thereof and to provide an output as a function of the deflections. According to this aspect of the invention, the wall, diaphragm, and pivoting member are integrally formed from a material so as to present an unbroken overall surface to the fluid and to reduce crevices or gaps in which portions of the fluid can lodge. In a preferred embodiment, the sensing means detachably connects to a post which in turn connects to the pivoting means through the diaphragm, the post being integrally formed with the other flowmeter components.

Another aspect of the present invention relates to a vortex flowmeter for measuring fluid flow, the flowmeter comprising a conduit having a wall surrounding a bore for carrying the fluid, the wall having a wall region of reduced stiffness, preferably a diaphragm, formed therein. A body disposed in the bore has an upstream extremity, a downstream extremity, and an intermediate portion connecting the upstream and downstream extremities. In a preferred embodiment, the intermediate portion includes a body region of reduced stiffness which is preferably a thinned area. One of the extremities, preferably the downstream extremity, has a first end connected to the wall region. The body region flexes to promote motion of at least a portion of the downstream extremity resulting from disturbances within the fluid induced by fluid flow around the body. The flowmeter further includes sensing means coupled to the downstream extremity for sensing the motion and providing an output as a function thereof and thereby also as a function of the flow. In another preferred embodiment, the downstream extremity has a second end connected to the conduit wall, and the body includes a second thinned area disposed between the first and second ends of the downstream extremity, the second thinned area also flexing to promote the motion. In still another preferred embodiment, the sensing means preferentially senses lateral motion rather than longitudinal motion, and removably attaches to a post extending from the wall region away from the bore, the post transmitting the motion to the sensing means.

BRIEF DESCRIPTION OF THE DRAWINGS

FIGS. 1a and 1b are partial cut-away views of flowmeters in accordance with the present invention;

FIGS. 4a and 4b are partial cut-away views of further flowmeters in accordance with the present invention;

FIG. 5a is a partial cut-away view of still another flowmeter in accordance with the present invention;

FIG. 5b is a cross-sectional view along line 5b—5b in FIG. 5a;

FIG. 7a is a cross-sectional view of the shedding bar of FIG. 1b, taken along line 7a—7a, FIG. 7b is a cross-sectional view of a PRIOR ART shedding bar assembly;

FIG. 8 is a cross-sectional view taken along line 1c—1c in FIG. 1b;

DETAILED DESCRIPTION OF THE PREFERRED EMBODIMENTS

Figure 1A:
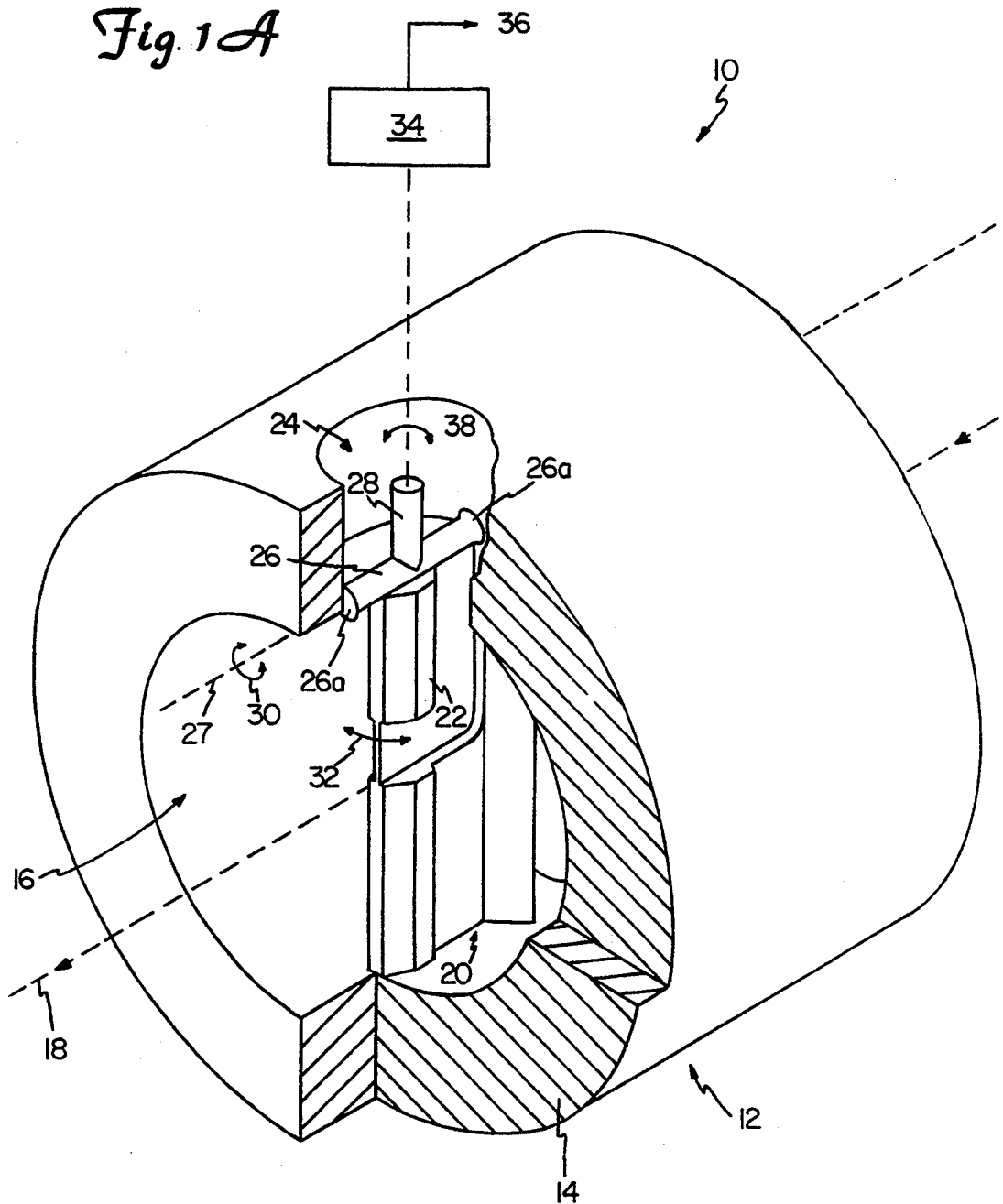

In FIG. 1a, flowmeter 10 includes a conduit 12 having a wall 14 surrounding a bore 16. Bore 16 carries a fluid, which can be a liquid or a gas, generally along a directed bore axis 18. As is known in the art, a Karman vortex street results when a fluid flows around an obstruction, provided the Reynolds number of the flow is in a specified range. In FIG. 1a, shedding bar 20 is the vortex-generating obstruction. Fluctuating fluidic pressures act on pivoting member 22, which extends from a hole 24 formed in wall 14 into bore 16, and on other portions of shedding bar 20, such that pivoting member 22 moves in response to the fluctuating pressures. According to an aspect of the invention, a torsional pin 26 is disposed in hole 24 and coupled to pivoting member 22. One or, preferably, both pin ends 26a, 26a are fixedly attached to wall 14, and a pin axis 27 is substantially parallel to bore axis 18. With this arrangement, portions of pin 26 between fixed pin ends 26a, 26a twist about pin axis 27 as shown by double arrow 30 in response to pivotal motion of pivoting member 22 about pin axis 27, shown by double arrow 32. Since pin ends 26a, 26a are fixed to conduit wall 14, pin 26 provides a force tending to restore pivoting member 22 to its equilibrium position. Such restoring force tends to increase the natural frequency of vibration of pivoting member 22, which is advantageous to ensure that the natural frequency of pivoting member 22 is higher than the highest vortex frequency to be encountered during operation. Pin 26 also functions to reduce undesired motion of pivoting member 22 parallel to bore axis 18, which motion is normally caused by local mechanical vibration or other influences not indicative of the fluid flow. By reducing such motion, noise and spurious signals are thus reduced in the instrument. Moreover, pin 26 permits flow-indicative motion of pivoting member 22 transverse to the flow, shown at double arrow 32. Sensing means 34, coupled to pivoting member 22 preferably by attachment to a post 28, senses the motion of pivoting member 22 and provides an output at 36 indicative of the motion and therefore also of the flow, since the frequency of the motion is a function of the volumetric flow rate. Post 28 pivots about pin axis 27, moving predominantly along double arrows 38, due to the above described influence of pin 26 and pivoting member 22.

In FIG. 1a, hole 24 is preferably sealed by known means such as a cover or cap, not shown, to reduce or prevent fluid leakage from bore 16 through hole 24 to the environment around conduit 12. Also, shedding bar 20 preferably has a general shape or outline predominantly as described in U.S. Pat. No. 4,464,939, assigned to the same assignee as the present application and incorporated herein by reference.

FIG. 1b shows a flowmeter 10a similar to flowmeter 10 except that flowmeter 10a includes a region of reduced stiffness, shown in FIG. 1b as diaphragm 40, extending across hole 24. Diaphragm 40 thus borders on blind hole 24a, and preferably fluidically isolates hole 24a from bore 16. By isolating sensing means 34 or other flowmeter components from the measured fluid, flowmeter 10a can measure benign as well as harsh fluids such as acids.

In addition to the beneficial functions of torsional pin 26 mentioned in connection with FIG. 1a, pin 26 can benefit flowmeter 10a further when used to reinforce diaphragm 40. First, by reinforcing diaphragm 40, pin 26 enhances measurement capability in the presence of changing line pressure of the fluid (line pressure being the pressure of the fluid in bore 16 referenced to the environment outside wall 14) when compared with a similar flowmeter without pin 26 used as a reinforcement. Nonzero values of line pressure produce stresses in and cause distortions of diaphragm 40. Changing line pressure accordingly changes those stresses and distortions, giving rise to motion of diaphragm 40, pivoting member 22, and post 28. Preferred sensing means 34, discussed in more detail below, preferentially senses transverse motions of post 28 rather than longitudinal motions of post 28 along its length. With such sensing means, benefits can be realized by making the effective area of both halves of diaphragm 40 approximately equal (the halves being separated by pin 26), and by precisely positioning or centering the pivoting member on the diaphragm, so that changes in line pressure cause predominantly longitudinal rather than transverse pivotal motion of post 28. In practice, however, sensing means 34 does, to some extent, sense motion of post 28 and the other members due to changing line pressure. If the line pressure fluctuates in a periodic fashion, caused for example by a mechanical pump in the flow stream, then the corresponding motion of diaphragm 40, pivoting member 22, and post 28 can be detected by sensing means 34 and erroneously interpreted as a flow signal. By reinforcing diaphragm 40, pin 26 reduces the stresses and distortions due to line pressure effects, thereby reducing the accompanying motion of the post and other flowmeter components, and enhancing measurement capability.

Second, by strengthening diaphragm 40 pin 26 raises the value of line pressure needed to rupture diaphragm 40, thereby permitting higher static line pressure operation. Both pin ends 26a, 26a are preferably attached directly to conduit wall 14 for maximum strengthening and reinforcement of diaphragm 40.

Figure 1C:
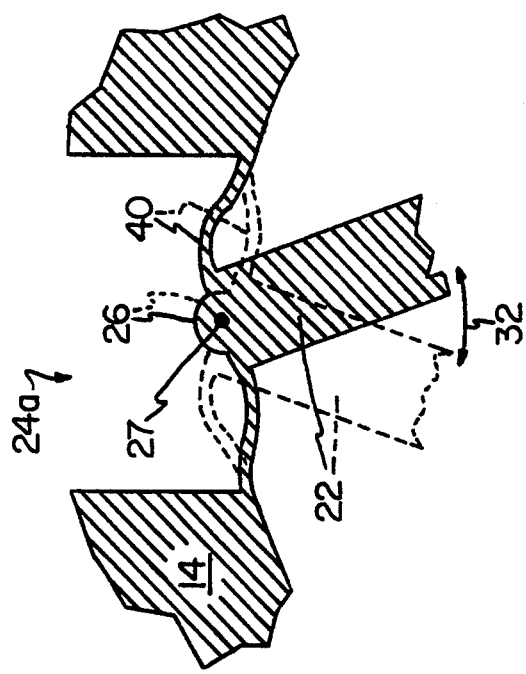
FIG. 1c is a cross-sectional view of a pivoting member and some neighboring parts taken along line 1c—1c of FIG. 1b.

FIG. 1c depicts the vicinity of diaphragm 40 of FIG. 1b in cross-section along line 1c—1c, and illustrates (in greatly exaggerated fashion) the pivotal motion of member 22, the twisting of torsional pin 26, and the flexing of diaphragm 40. Double arrow 32 indicates generally the motion of pivoting member 22. Solid line and broken lines show the position of the parts at maximum deflection in either direction.

Figure 2B:
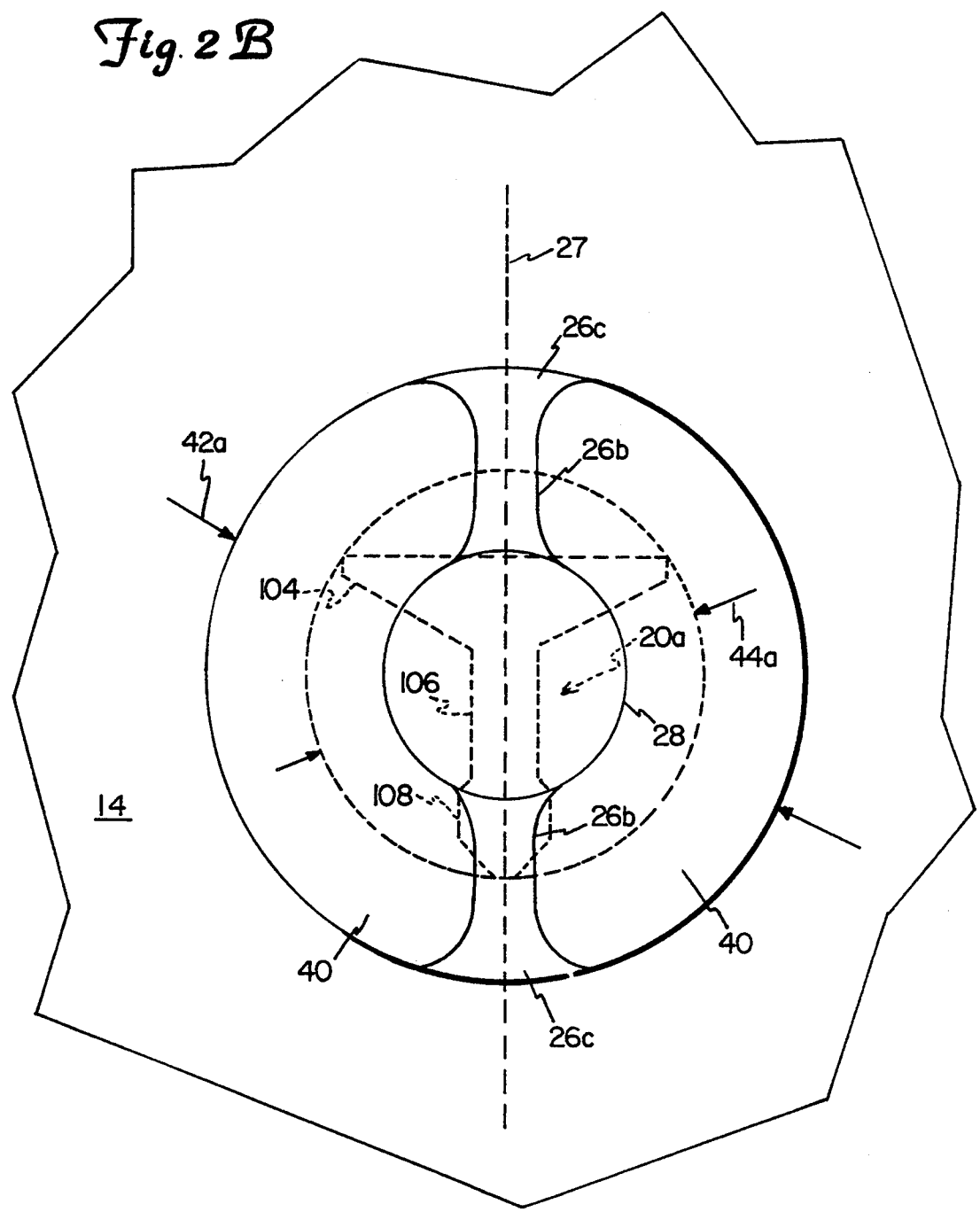
FIG. 2b is an overhead view of a torsional pin with neighboring parts, wherein the pivoting member is a complete shedding bar.
Figure 2A:
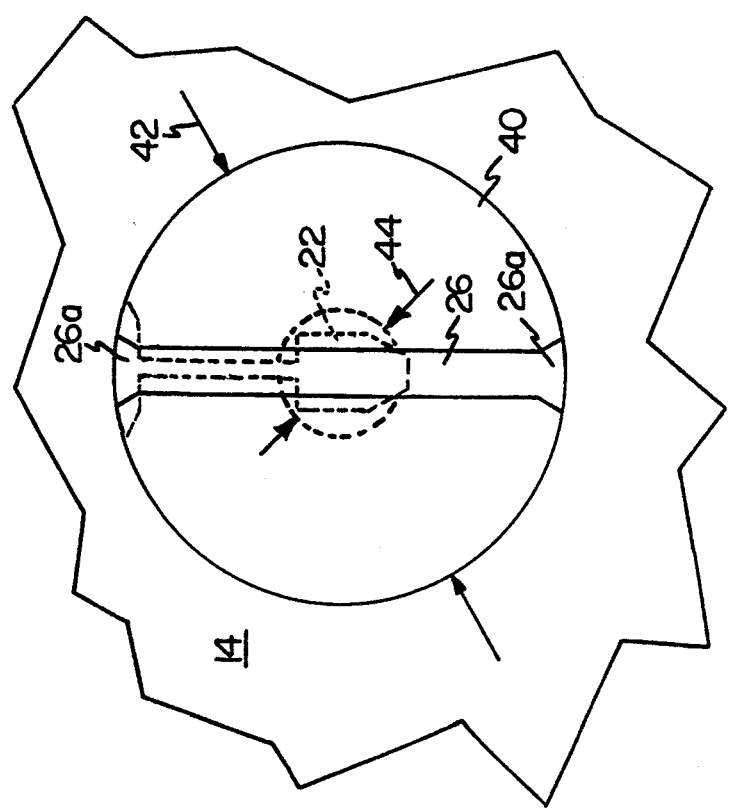
FIG. 2a is a view of the torsional pin of FIG. 1b with neighboring parts, viewed from above.

The overhead view of FIG. 2a shows selected parts of flowmeter 10a as viewed from sensing means 34. Diaphragm 40 along with attached pivoting member 22 advantageously form a rigid center diaphragm, having an outer (diaphragm) diameter determined by diameter 42 of diaphragm 40, and an inner (rigid center) diameter determined by effective diameter 44 of pivoting member 22. In this context, in the case of a "center" made of the same substance as the diaphragm, a rigid center is a center having a thickness generally at least six times the diaphragm thickness. The pivoting member of this and other embodiments preferably rigidly attaches to the diaphragm, thus forming a rigid center diaphragm, so that forces acting on the pivoting member are efficiently transmitted to the sensing means. In FIG. 2a, torsional pin ends 26a, 26a are shown fixedly attached to conduit wall 14.

FIG. 2b shows a view similar to that of FIG. 2a, but wherein the flowmeter differs somewhat from that of FIGS. 1a and 1b. In FIG. 2b, pivoting member 20a is substantially a complete shedding bar, comprising upstream extremity 104, intermediate portion 106, and downstream extremity 108. Torsional pin 26b has pin ends 26c, 26c fixedly attached to conduit wall 14. Pivoting member 20a has an effective diameter 44a, and diaphragm 40 has a diaphragm diameter 42a. FIG. 2b also shows post 28. Alternately, to permit greater motion of pivoting member 20a while maintaining a rigid connection to diaphragm 40, portions of pivoting member 20a adjacent to diaphragm 40 and extending beyond the perimeter of post 28 can be undercut. In such case, the diameter of the rigid center can have a value between the diameter of post 28 and diameter 44a. If undercutting is employed at the attachment of the pivoting member to the diaphragm, the lateral width of the undercut portion should be at least 50% of the lateral width of the pivoting member end, to maintain a rigid connection. "Lateral width", in FIG. 2b, means the width measured along an axis in the plane of the figure but perpendicular to axis 27.

Figures 3A, 3B:
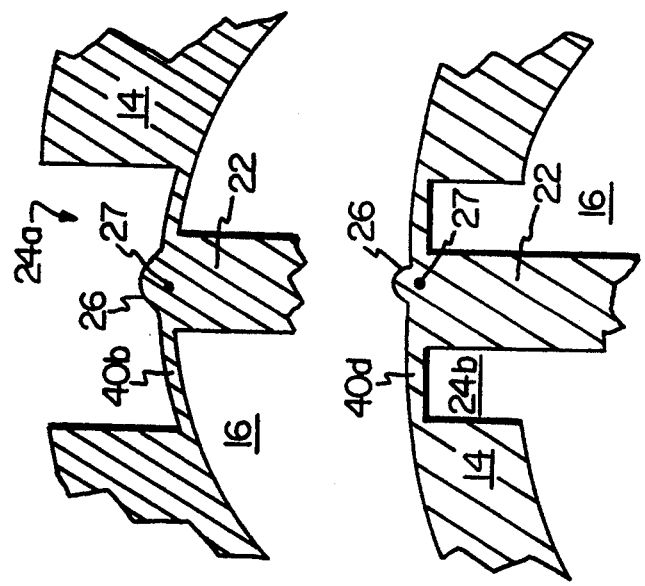
FIGS. 3a-3d are cross-sectional views of torsional pin and region of reduced stiffness arrangements useable with the invention.
Figures 3C, 3D:
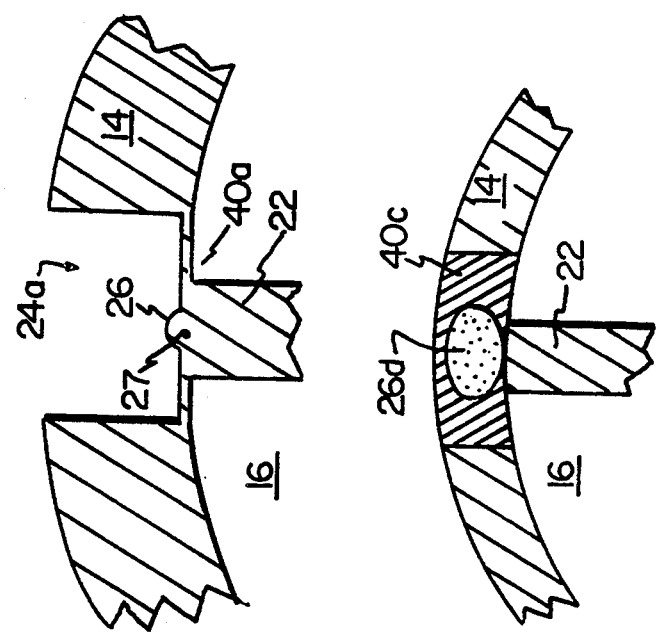

FIGS. 3a–3d show cross-sectional views of some more diaphragm and torsional pin configurations useable with the invention. In FIG. 3a, diaphragm 40a has a shape which is flat, and is joined to pivoting member 22. In FIG. 3b diaphragm 40b has a shape which is curved to conform to the generally right circular cylindrical shape of bore 16. A curved diaphragm has increased stiffness relative to a flat diaphragm, thereby reducing sensitivity of the flowmeter for a given diaphragm thickness. For a given minimum sensitivity, therefore, a flat diaphragm can have a greater thickness than a curved one, which is generally beneficial if the diaphragm is to be integrally formed. Curved diaphragms, on the other hand, improve flow characteristics of the fluid by conforming to the curved shape of pipe surfaces, and can be easier to fabricate than flat ones when using integral forming techniques. In FIG. 3c region of reduced stiffness 40c completely fills the hole in wall 14. Further, region 40c covers torsional pin 26d. Region 40c is composed of a substance having a reduced intrinsic stiffness with respect to conduit wall 14 adjacent to region 40c. Pin 26d is shown imbedded in region of reduced stiffness 40c, the pin being composed of a substance having increased intrinsic stiffness with respect to region 40c. Finally, FIG. 3d shows diaphragm 40d disposed near the outer surface of conduit wall 14 rather than near the inner surface proximate the bore. In such arrangement blind hole 24b is disposed on the same side of the region of reduced stiffness as bore 16, in contrast to the hole arrangement in FIGS. 3a and 3b.

Flowmeters 10 and 10a in FIGS. 1a and 1b can use many types of sensing means 34 to sense the motion of pivoting member 22. As an example, sensing means can employ known optical techniques to detect deflections of pin 26, post 28, or diaphragm 40 caused by the motion of pivoting member 22. In a preferred embodiment, flowmeters 10 and 10a include post 28 extending from torsional pin 26 or diaphragm 40, and sensing means 34 is a removeable or replaceable module coupling to post 28 and utilizing piezoelectric discs or crystals. This preferred sensing means includes an axially flexible diaphragm transmitting side-to-side (lateral) motions of post 28 to the piezoelectric crystals, but flexing so as to suppress transmission of motions along the length of post 28 to the piezoelectric crystals. The preferred sensing means is described in U.S. Pat. No. 4,926,695, assigned to the same assignee as the present application and herein incorporated by reference. The ability of the sensing means to preferentially sense lateral rather than longitudinal motion is important to ensure that the flowmeter will operate satisfactorily under nonideal operating conditions. Also, it is important that the preferred sensing means does not press against, load, or otherwise restrict diaphragm 40, thereby to permit diaphragm 40 to freely flex.

FIG. 4a shows a flowmeter 10b similar to the flowmeter of FIG. 1a, with conduit wall 14a surrounding bore 16a, and having pivoting member 22b coupled to torsional pin 26. FIG. 4b shows a flowmeter 10c similar to the flowmeter of FIG. 4a, but additionally having a diaphragm 40e extending across the hole in conduit wall 14a. Diaphragm 40e acts as a region of reduced stiffness within conduit wall 14a.

FIG. 5a shows, in partial cut-away view, a further embodiment 10d of a flowmeter utilizing the torsional pin of the present invention. Fluid flows generally along directed bore axis 18 around a portion of obstruction 42 disposed in bore 16b, referred to as a shedding bar portion, setting up a Karman vortex street in the fluid. Obstruction 42, coupled to torsional pin 44 and preferably also to post 46, pivots or bends generally about pin axis 48 in response to fluidic disturbances associated with the vortices. Obstruction 42 also pivots or bends about axis 49 (shown in FIG. 5b ) proximate its other end. The ends of torsional pin 44 are integrally joined to seating ring 50, which in turn attaches via a weld joint 51,51 around its periphery to conduit wall 14b. The pin ends are thereby fixedly attached to conduit wall 14b so that flowmeter 10d benefits from the torsional effects of the pin, discussed previously. Sensing means 34 senses motion of obstruction 42 via post 46 and provides output 36 as a function of such deflections. Flowmeter 10d also preferably includes diaphragm 52 extending across seating ring 50 such that pin 44 reinforces the diaphragm. A flow module comprising obstruction 42, pin 44, and seating ring 50 can serve as a flowmeter when coupled to sensing means 34 and inserted into conduit 14b. Such a flow module, also preferably including diaphragm 52 and post 46, inserts into and mates with port 54 of conduit wall 14b. To hold the flow module in place, other known methods besides welding can be used to secure seating ring 50 to conduit 14b, such as brazing, cementing, solvent bonding, press-fitting, screwing, and so on.

FIG. 5b shows a partially broken away sectional view taken along line 5b, 5b of FIG. 5a. To enhance pivotal motion, obstruction 42 can be undercut at a first end 53a where it couples to seating ring 50, and at a second end 53b where it couples to a lower seating member 56. Weld joint 57a, 57a secures obstruction 42 to lower seating member 56, and weld joint 57b, 57b secures member 56 to conduit wall 14b. End 53a preferably has a circular cross-sectional shape having a diameter not less than a diameter of post 46. As discussed in connection with FIGS. 2a and 2b, the undercut should be such as to maintain a rigid connection between obstruction 42 and diaphragm 52. End 53b preferably has a cross-sectional shape which is elongated parallel to bore axis 18. The undercut portions of obstruction 42 are disposed outside of bore 16b so that they do not significantly affect the fluid flow. However, obstruction 42 is shaped such that small gaps, shown exaggerated at 58, remain between obstruction 42 and conduit wall 14b, thereby to allow pivotal motion of obstruction 42. Pivoting members shown in other embodiments can also include an undercut region or regions to promote pivotal motion.

Also shown in FIG. 5b is a portion of a preferred sensing means 34a, including motion transmitting tube 34b and axially flexible diaphragm 34c. Axially flexible diaphragm 34c is rigid in the lateral direction, efficiently transmitting forces to piezoelectric crystals (not shown), and weak in the axial direction so that vertical motions of post 46 are largely absorbed by flexing of the axially flexible diaphragm 34c. The sensing means does not press against or restrict diaphragm 52, allowing the diaphragm 52 to freely flex.

Figure 6A:
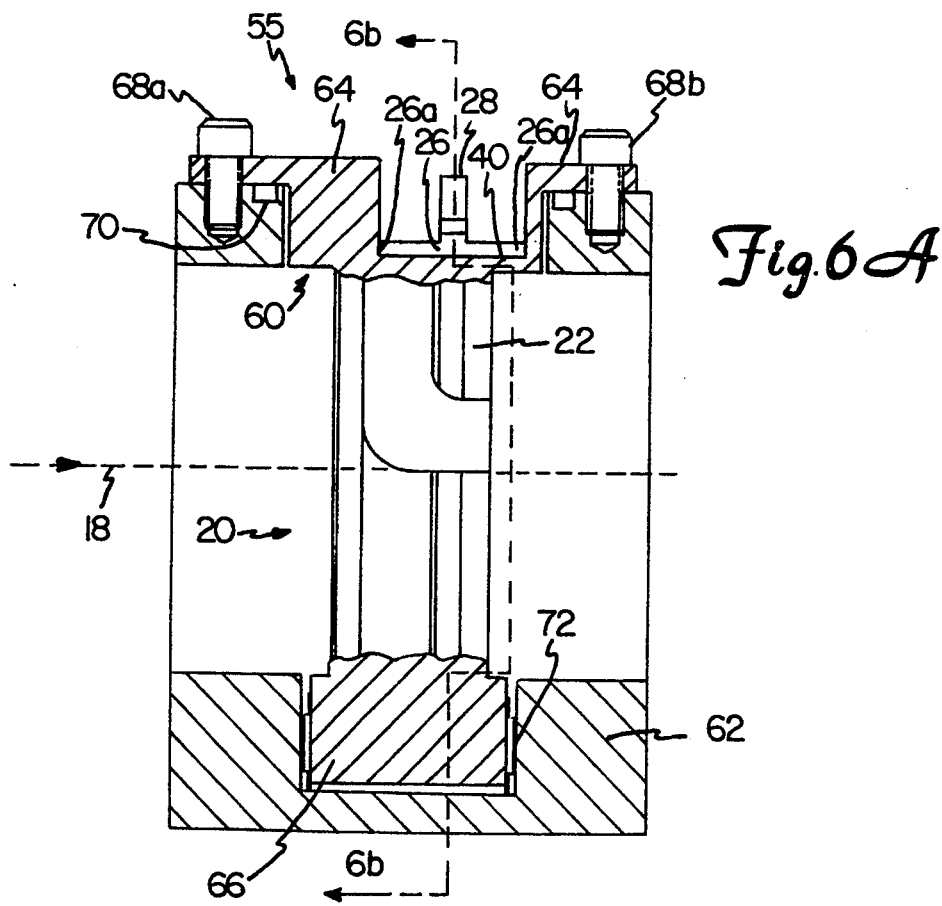
FIGS. 6a and 6b are views of a flow module in accordance with the present invention.
Figure 6B:
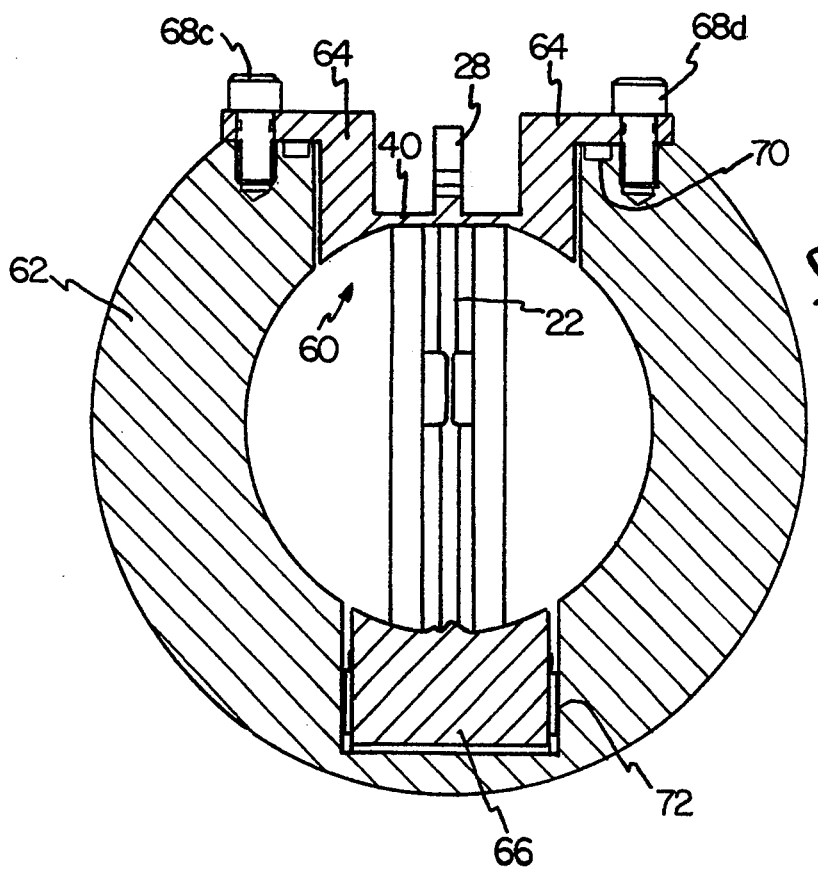

FIG. 6a shows a partial cross-sectional side view of a removeable flow module 55 in accordance with the invention. FIG. 6b shows a view along line 6b, 6b. Flow module 55 is similar to flowmeter 10a of FIG. 1b, except that flow module 55 preferably does not include a conduit portion but rather inserts into a port 60 of an existing conduit or pipe 62. Flow module 55 comprises seating ring 64, diaphragm 40, torsional pin 26 having pin ends 26a, 26a fixedly attached to seating ring 64, shedding bar 20 of which pivoting member 22 is at least a portion, and preferably also module end 66 and post 28. The flow module is preferably integrally formed from a material to reduce cost. Upon insertion of flow module 55 into port 60, seating member 64 mates with port 60 and is secured to conduit 62 by screws 68a, 68b, 68c, 68d. O-ring 70 effectively seals port 60 to prevent fluid leakage out of conduit 62. Stiff ring clip 72, or other stiff attachment means, holds module end 66 firmly to conduit 62. In place of shedding bar 20 with pivoting member 22, flow module 55 can include other arrangements such as shedding bar 20b with pivoting member 22b (FIG. 4a ), or combined pivoting member and shedding bar 20a (FIG. 2b ), or obstruction 42 (FIGS. 5a and 5b ). Sensing means 34 provides a flow-indicative output 36 as in previously discussed embodiments.

In embodiments of the invention utilizing both a diaphragm and a torsional pin, the pin is preferably disposed on a side of the diaphragm away from the conduit bore, so as to minimally disturb fluid flow in the bore.

Another aspect of the present invention lies in the use of a "tail" portion of the shedding bar as a vibrating or pivoting member. Turning again to FIG. 1b, shedding bar 20 comprises generally upstream extremity 104a, intermediate portion 106a, and downstream extremity 108a. Downstream extremity 108a includes pivoting member 22, the motion of which is sensed to provide output 36. Using the downstream extremity (or a portion thereof) as the pivoting member takes advantage of the fact that one edge—the trailing edge—is already free to pivotally deflect since it is unattached except possibly at conduit wall 14. Additionally, the thinned area at 110, part of intermediate portion 106a, permits greater freedom of movement of the other edge—the leading edge—of pivoting member 22 by bending or flexing. For efficient pivotal motion, the pivoting member is preferably a relatively stiff, rod-like structure, it is exposed to the flowing fluid, and it rigidly attaches to the diaphragm formed in the conduit wall.

FIG. 7a shows a cross-sectional view, taken along line 7a 7a of FIG. 1b, of shedding bar 20 which includes downstream extremity pivoting member 22, thinned area 110, and upstream extremity 104a. The fluid moves in the general direction shown by arrow 111. Broken circle 116 shows the location of diaphragm 40. Disturbances induced by fluid flow around shedding bar 20 produce alternating differential pressure across shedding bar 20. Arrows 114 represent differential pressure forces acting on portions of the shedding bar at an instant in time, which forces contribute to the motion of pivoting member 22.

Utilization of downstream extremity pivoting member 22 with thinned area 110 has the advantage of increased surface area over which the differential pressure forces contributing to the motion act, when compared to a similar size prior art shedding bar assembly 20c of FIG. 7b. In that figure, arrows 114a show forces due to differential pressure which contribute to the motion of sensing beam 118, acting primarily at the intermediate portion of shedding bar assembly 20c. Prior art assembly 20c is disclosed in U.S. Pat. No. 4,926,695, mentioned above. In FIG. 7a, forces at 114 act on pivoting member 22 and on thinned area 110, producing a bending moment 120 about axis 122, perpendicular to the plane of FIG. 7a. The use of a relatively large surface area of shedding bar assembly 20 enables thinned area 110 to be thicker than sensing diaphragm 124 of FIG. 7b for a given measurement sensitivity. This is particularly advantageous when shedding bar assembly 20 is integrally cast from a metal because known casting methods can reliably and at a reasonable cost produce parts only if the thickness of such parts exceeds a given minimum thickness. For typical metals, flowmeter sizes, and sensitivity requirements the thickness of thinned area 110 is greater than such minimum thickness, enabling integral cast construction, while the thickness of prior art sensing diaphragm 124 is less than such minimum thickness, requiring individual machining of parts. If desired, the natural frequency of pivoting member 22 can be specified by adjusting or setting the thickness of thinned area 110, the frequency increasing with increasing thickness.

By utilizing downstream extremity pivoting member 22 shedding bar 20 has the additional advantage over shedding bar assembly 20c of compatibility with a larger diameter diaphragm as shown by outline 116, compared with diaphragm outline 115 for assembly 20c. Use of a larger diameter diaphragm permits an increased diaphragm thickness while maintaining adequate diaphragm flexibility. This is advantageous for integrally formed diaphragms for the same reasons discussed in connection with an integrally cast thinned area 110.

Turning again to FIG. 1b, shedding bar 20 preferably also includes thinned area 112 as part of downstream extremity 108a. As shown, areas 112 and 110 preferably meet to form an L-shaped feature. A cross-sectional view taken along line 1c—1cappears in FIG. 8. There, arrows 126 similar to arrows 114 of FIG. 7a show forces due to differential pressure which contribute to the motion of pivoting member 22, such forces producing bending moment 128 about pin axis 27. Thinned area 112 flexes to promote pivoting of pivoting member 22 about axis 27. As with area 110, the thickness of area 112 can be adjusted or set to ensure a sufficiently high natural frequency of pivoting member 22, while still ensuring adequate deflection measurable by sensing means 34.

One or both of the thinned areas 110, 112, if desired, can be eliminated and replaced by material which is not "thinned" but rather conforms to the shape of the unmodified shedding bar and which has reduced intrinsic stiffness compared to neighboring parts, thereby having increased flexibility similar to the thinned areas in order to promote motion of the pivoting member. This approach is advantageous because it minimally perturbs the relationship between the vortex-shedding frequency and the flow rate, since that relationship can change with modifications to the shape of the shedding bar outer surface such as by introduction of thinned areas.

Figure 9A:
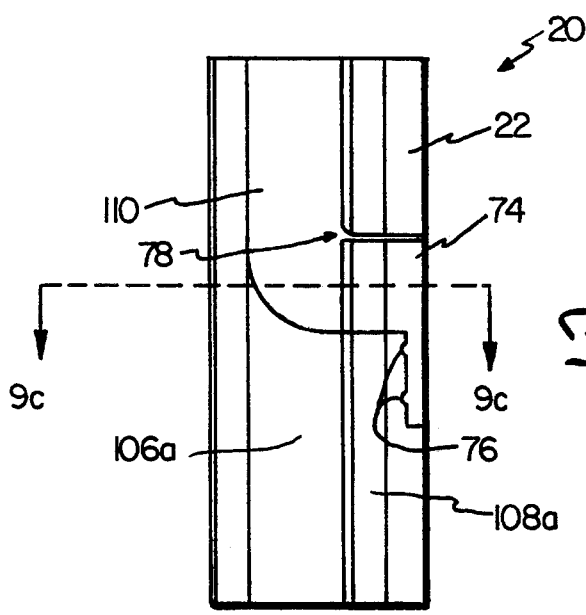
FIGS. 9a, 9b, and 9c are views of a shedding bar with a cover member useable with the present invention.
Figure 9C:
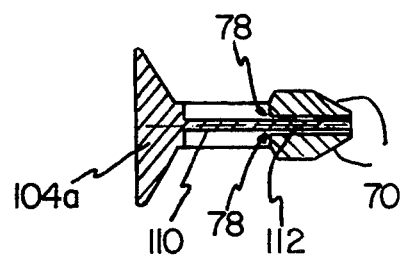
Figure 9B:
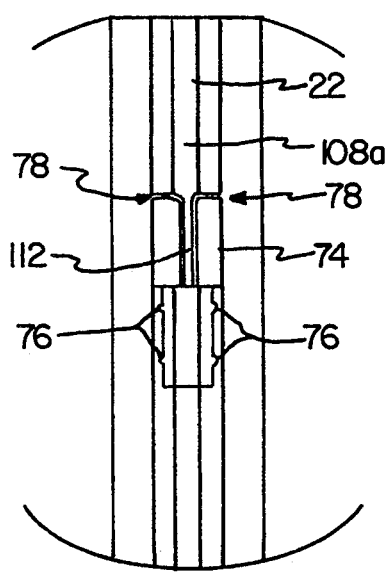

Alternately, reduced perturbation of the relationship between vortex frequency and flow rate can be achieved by positioning a cover member or members over at least a portion of the thinned area. FIGS. 9a, 9b, and 9c show a side, rear, and cross-sectional view, respectively, of such a cover member 74 attached to shedding bar 20 of FIG. 1b. Weld points at 76 hold cover member 74 in place. Cover member 74 substantially covers thinned area 112 such that downstream extremity 108a together with cover member 70 present a substantially uniform outer surface to the fluid along the entire length of downstream extremity 108a. Gaps 78 between cover member 74 and neighboring parts permit thinned areas 110 and 112 to flex to substantially the same degree they could flex without the cover member, so as not to further restrict pivotal motion of pivoting member 22. If desired, a cover member can also cover thinned area 110 such that intermediate portion 106a together with that cover member similarly present a substantially uniform outer surface to the fluid along its length.

FIG. 1a shows shedding bar 20 utilizing downstream extremity pivoting member 22, as in FIG. 1b. FIG. 4a shows a shedding bar 20b, similar to that of FIGS. 1a and 1b, which includes upstream extremity 104b, intermediate portion 106b (including thinned area 110a), and downstream extremity 108b (including thinned area 112a). In FIG. 4a, however, thinned areas 112a and 110a attach directly to conduit wall 14a.

An alternative, though not preferred, embodiment of the invention utilizes at least a portion of the upstream extremity rather than the downstream extremity as the pivoting member. The differential pressure forces referred to earlier are believed to be generally weaker at the upstream extremity than at the downstream extremity, but may nonetheless be sufficient when combined with the forces on the intermediate portion to yield a measurable motion of the upstream extremity. Like the downstream extremity, the upstream extremity has an unattached edge which is free to deflect. Since the shape of the upstream extremity has a particularly strong influence on the vortex shedding behavior of the device, incorporation of a thinned area in the upstream extremity to facilitate pivotal motion of a portion thereof may adversely affect the relationship between vortex shedding frequency and flow rate. This problem can be reduced either by using, in place of the thinned areas, material which conforms to the shape of the remainder of the shedding bar and which has reduced intrinsic stiffness (referred to above), or by using cover members with the thinned areas.

Figure 10A:
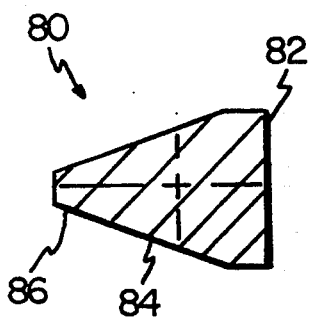
FIGS. 10a and 10b are cross-sectional views of an alternate shedding bar shape useable with the present invention.
Figure 10B:
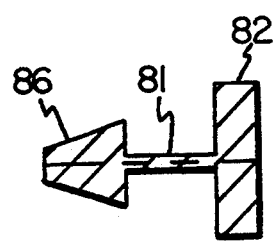
Figure 11A:
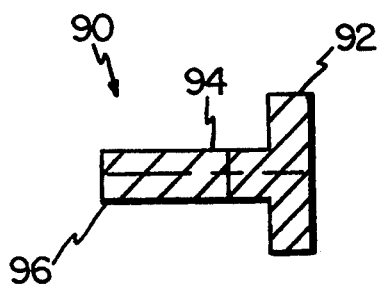
FIGS. 11a and 11b are cross-sectional views of still another shedding bar shape useable with the present invention.
Figure 11B:
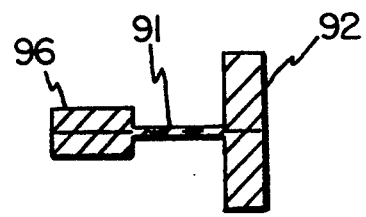

FIG. 10a shows in cross-section an alternate shedding bar shape useable with the invention, the shedding bar 80 including upstream extremity 82, intermediate portion 84, and downstream extremity 86. FIG. 10b shows shedding bar 80 of FIG. 10a, but where intermediate portion 84 includes a thinned area 81 to promote pivotal motion of the downstream (or upstream) extremity. Similarly, shedding bar 90, shown in cross section in FIG. 11a and including upstream extremity 92, intermediate portion 94, and downstream extremity 96, is also useable with the invention. FIG. 11b shows shedding bar 90 of FIG. 11a, but including thinned area 91 as part of intermediate portion 94 to facilitate motion of the downstream (or upstream) extremity.

Still another aspect of the present invention relates to the way in which parts of the flowmeter are formed and are held together. In flowmeter 10 of FIG. 1a, conduit wall 14, shedding bar 20 (including pivoting member 22 and thinned areas 110 and 112, labelled in FIG. 1b), torsional pin 26, and post 28 are preferably integrally formed from a given material such as metal, plastic, ceramic, or the like. Investment casting from a metal such as a stainless steel, a carbon steel, or a chromium-nickel alloy (e.g., Hastelloy, sold by Union Carbide Corp.) is preferred for most flowmeters designed for industrial applications. In similar fashion, injection molding from plastic can be used in other applications. In flowmeter 10a of FIG. 1b, diaphragm 40 is integrally formed with the parts referred to in connection with flowmeter 10. Such an integrally formed flowmeter 10a has both cost benefits, by reduced machining and assembly steps required for manufacture, and other benefits related to the absence of weld joints which are susceptible to corrosion, and the absence of gaps or crevices between the parts in which the fluid can lodge. This latter feature is a result of the continuous unbroken overall surface to which the fluid is exposed, resulting from the integral forming process, and is required in sanitary applications in which the fluid is, for example, a food or beverage. The pivoting member, torsional pin, diaphragm, and conduit wall shown in each of FIGS. 1c, 2a, 2b, 3a, 3b, and 3d, as well as the post shown in some of the embodiments, are preferably integrally formed as a single unit. Flowmeters 10b and 10c of FIGS. 4a and 4b (excluding sensing means 34 with output 36) are also preferably integrally formed as single units. Flow module 55 of FIGS. 6a and 6b is also preferably integrally formed. It is particularly advantageous to integrally form the diaphragm, as well as the thinned areas (shown for example at 110 and 112 of FIG. 1b), along with the other parts because the diaphragm and thinned areas would require special care and cost in machining. Also, since the precise placement of the pivoting member on the diaphragm can greatly affect the instrument's response to changing line pressure, by integrally forming the diaphragm together with the pivoting member in a predetermined positional relationship, reduced sensitivity to changing line pressure can be assured in a highly repeatable fashion with little or no assembly and at low cost.

Although the present invention has been described with reference to preferred embodiments, workers skilled in the art will recognize that changes can be made in form and detail without departing from the spirit and scope of the invention.

What is claimed is:

1. A vortex flowmeter for measuring fluid flow, comprising:
   a conduit having a wall surrounding a bore for carrying the fluid along a bore axis, the wall having a hole formed therein;
   a pivoting member extending from the hole into the bore, the pivoting member moving in response to disturbances within the fluid at a frequency indicative of the flow;
   sensing means coupled to the pivoting member for sensing the motion thereof to provide an output indicative of the flow;
   a torsional pin disposed in the hole and coupled to the pivoting member, the pin having a first pin end attached to the wall; and
   a region of reduced stiffness formed in the wall and sealingly extending across the hole, wherein the pin reinforces the region.

2. The flowmeter as recited in claim 1, wherein the torsional pin further includes a second pin end attached to the wall, and wherein the torsional pin has a pin axis substantially parallel to the bore axis to permit pivotal motion of the pivoting member about the pin axis.

3. The flowmeter as recited in claim 1, further comprising a post extending from the region away from the bore, wherein the sensing means couples to the post, and further wherein the sensing means preferentially senses lateral motion rather than longitudinal motion.

4. The flowmeter as recited in claim 3, wherein the region comprises a reduced thickness portion of the wall, thereby forming a blind hole in the wall.

5. The flowmeter as recited in claim 1, wherein the region comprises a diaphragm.

6. The flowmeter as recited in claim 5, wherein the diaphragm is substantially planar.

7. The flowmeter as recited in claim 5, wherein the conduit wall has a curved surface to which the diaphragm is shaped to substantially conform.

8. The flowmeter as recited in claim 1, wherein the pin is integrally joined to the region, and wherein the pin protrudes from a side of the region which is isolated from the fluid.

9. The flowmeter as recited in claim 1, wherein the wall, region, pivoting member, and pin are integrally formed from a material.

10. The flowmeter as recited in claim 1, wherein the pivoting member generates the disturbances within the fluid.

11. The flowmeter as recited in claim 1, further comprising:
   generating means for generating the disturbances within the fluid, the generating means including at least a portion of the pivoting member.

12. The flowmeter as recited in claim 11, wherein the generating means includes an upstream extremity, a downstream extremity, and an intermediate portion connecting the upstream and downstream extremities, and wherein the downstream extremity includes the pivoting member.

13. The flowmeter as recited in claim 1, wherein the wall, pivoting member, and pin are integrally formed from a material.

14. A device for insertion into a port in a conduit wall to measure fluid flow along the conduit, comprising:
   a mating member adapted to mate with the port, the mating member having a hole formed therein;
   a pivoting member extending from the hole away from the mating member, the pivoting member adapted to move in response to disturbances within the fluid at a frequency indicative of the flow;
   sensing means coupled to the pivoting member for sensing the motion thereof to provide an output indicative of the flow;
   a torsional pin disposed in the hole and coupled to the pivoting member, the pin having a first pin end attached to the mating member; and
   a region of reduced stiffness formed in the mating member and sealingly extending across the hole, wherein the pin reinforces the region.

15. The device as recited in claim 14, wherein the pin further includes a second pin end attached to the mating member, and wherein the pin has a pin axis to permit pivotal motion of the pivoting member about the pin axis.

16. The device as recited in claim 14, wherein the pivoting member generates the disturbances within the fluid.

17. The device as recited in claim 14, further comprising:
   generating means for generating the disturbances within the fluid, the generating means including at least a portion of the pivoting member.

18. A vortex flowmeter for measuring the flow of a fluid, comprising:
   a conduit having a wall surrounding a bore for carrying the fluid, the wall having a diaphragm formed therein;
   a pivoting member disposed in the bore and connected to the diaphragm;
   sensing means coupled to the pivoting member for sensing pivotal motion thereof and providing an output as a function of the pivotal motion;
   a body disposed in the bore and including at least a portion of the pivoting member, the body including a downsteam extremity which includes the pivoting member;
   wherein the wall, the diaphragm, and the pivoting member are integrally formed from a material such that they present an unbroken overall surface to the fluid; and
   wherein the body induces disturbances in the fluid as a function of the flow which cause the pivoting member to pivot with a frequency indicative of the flow.

19. A vortex flowmeter for measuring the flow of a fluid, comprising:
   a conduit having a wall surrounding a bore for carrying the fluid, the wall having a diaphragm formed therein;
   a pivoting member disposed in the bore and connected to the diaphragm, wherein the wall, the diaphragm, and the pivoting member are integrally formed from a material such that they present an unbroken overall surface to the fluid;
   sensing means coupled to the pivoting member for sensing pivoting motion thereof and providing an output as a function of the pivotal motion; and
   a torsional pin proximate the diaphragm and coupled to the pivoting member, the pin having first and second pin ends attached to the wall and having a pin axis substantially parallel to a direction of fluid flow through the bore, wherein the torsional pin is integrally formed from the material with the wall, the diaphragm, and the pivoting member.

20. A device for insertion into a port in a conduit wall to measure fluid along the conduit, comprising:
   a mating member adapted to mate with the port, the mating member having a hole formed therein;
   a pivoting member extending from the hole away from the mating member, the pivoting member adapted to move in response to disturbances within the fluid at a frequency indicative of the flow;
   a region of reduced stiffness formed in the mating member and sealingly extending across the hole, wherein the mating member, the region of reduced stiffness, and the pivoting member are integrally formed from a material;
   sensing means coupled to the pivoting member for sensing the motion thereof to provide an output indicative of the flow; and
   a torsional pin disposed in the hole and coupled to the pivoting member, the pin having first and second pin ends attached to the mating member and having a pin axis to permit pivotal motion of the pivoting member about the pin axis;
   wherein the torsional pin is integrally formed with the mating member, the region, and the pivoting member.

21. The device as recited in claim 20, wherein the pivoting member generates the disturbances within the fluid.

22. The device as recited in claim 20, further comprising:
generating means for generating the disturbances within the fluid, the generating means including at least a portion of the pivoting member.

23. A vortex flowmeter for measuring fluid flow, comprising:
a conduit having a wall surrounding a bore for carrying the fluid, the wall having a wall region of reduced stiffness;
a body disposed in the bore and having an upstream and a downstream extremity, the downsteam extremity having a first end adjoining the wall region and a second end attached to the wall, the upstream extremity being disposed so as to not adjoin the wall region, the body further including a body region of reduced stiffness; and
sensing means coupled to the downstream extremity for sensing motion of at least a portion thereof resulting from disturbances within the fluid, and providing an output as a function of the motion and thereby also as a function of the flow;
wherein the body region is a thinned area of the body that flexes to promote the motion and is disposed between the upstream and downstream extremities; and
wherein the body further includes a second thinned area disposed between the first and second ends of the downstream extremity, the second thinned area also flexing to promote the motion 24. The flowmeter as recited in claim 23, further comprising:
a post extending from the wall region away from the bore and coupled to the sensing means, the post transmitting the motion to the sensing means;
wherein the sensing means removably attaches to the post.

25. A vortex flowmeter for measuring fluid flow, comprising:
a conduit having a wall surrounding a bore for carrying the fluid, the wall having a wall region of reduced stiffness;
a body disposed in the bore and having an upstream and a downstream extremity, the downstream extremity having a first end adjoining the wall region and a second end attached to the conduit, the upstream extremity being disposed so as to not adjoin the wall region, the body further including a body region of reduced stiffness;
sensing means coupled to the downstream extremity for sensing motion of at least a portion thereof resulting from disturbances within the fluid, and providing an output as a function of the motion and thereby also as a function of the flow; and
wherein the body region is a thinned area of the body that flexes to promote the motion and is disposed between the first and second ends of the downstream extremity.

26. A vortex flowmeter for measuring fluid flow, comprising:
conduit having a wall surrounding a bore for carrying the fluid, the wall having a wall region of reduced stiffness;
a body disposed in the bore and having a first and second extremity, the second extremity having a first end adjoining the wall region, the first extremity being disposed so as to not adjoin the wall region, the body further including a body region of reduced stiffness;
sensing means coupled to the second extremity for sensing motion of at least a portion thereof resulting from disturbances within the fluid, and providing and output as a function of the motion and thereby also as a function of the flow; and
a torsional pin reinforcing the wall region, the pin having pin ends attached to the wall and having a pin axis substantially parallel to the bore axis;
wherein the body region flexes to promote the motion.

27. A vortex flowmeter for measuring fluid flow, comprising:
a conduit having a wall surrounding a bore for carrying the fluid, the wall having a wall region of reduced stiffness:
a body disposed in the bore and having a first and a second extremity, the second extremity having a first end adjoining the wall region, the first extremity being disposed so as to not adjoin the wall region, the body further including a body region of reduced stiffness wherein the region of reduced stiffness is thinned area of the body;
sensing means coupled to the second extremity for sensing motion of at least a portion thereof resulting from disturbances within the fluid, and providing an output as a function of the motion and thereby also as a function of the flow; and
one or more cover members disposed to substantially cover surfaces to the thinned area while not substantially inhibiting the motion;
wherein the body region flexes to promote the motion.

* * * * *

UNITED STATES PATENT AND TRADEMARK OFFICE
CERTIFICATE OF CORRECTION

PATENT NO. : 5,343,762
DATED : September 6, 1994
INVENTOR(S) : Melvin R. Beulke

It is certified that error appears in the above-indentified patent and that said Letters Patent is hereby corrected as shown below:

Column 12, line 42, after "fluid" insert --flow--.

Column 14, line 10, before "conduit" insert --a--.

Column 14, line 14, before first occurrence of "second" insert --a--.

Column 14, line 47, delete "to" and insert --of--.

Signed and Sealed this

Twenty-second Day of August, 1995

Attest:

BRUCE LEHMAN

*Attesting Officer*   *Commissioner of Patents and Trademarks*